(No Model.)
J. F. GUBBINS.
DRYING AND PULVERIZING APPARATUS.
No. 263,172. Patented Aug. 22, 1882.
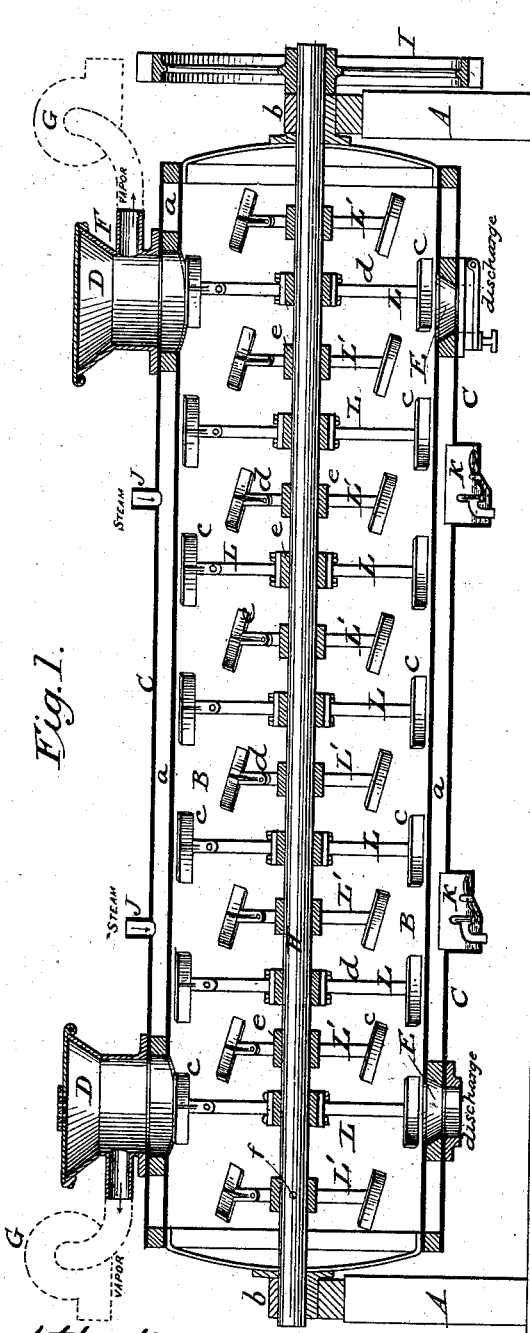
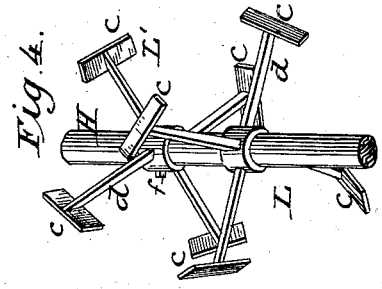
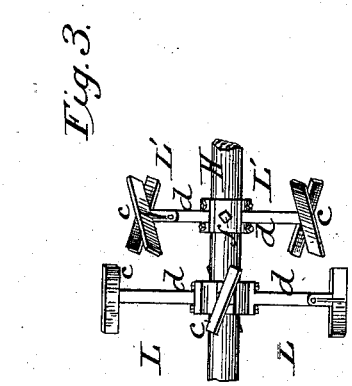
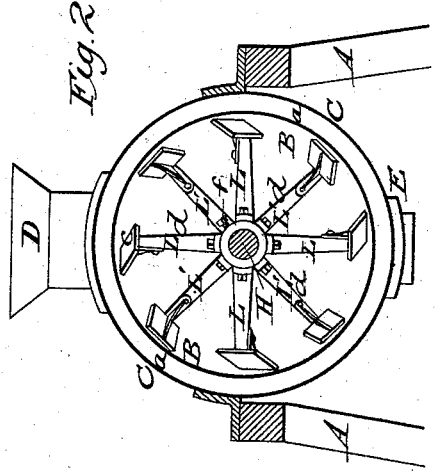
Attest,
Sidney P. Hollingsworth
Walter S. Dodge.
Inventor:
John F. Gubbins,
by Dodge Son,
Attys.

UNITED STATES PATENT OFFICE.

JOHN F. GUBBINS, OF CHICAGO, ILLINOIS.

DRYING AND PULVERIZING APPARATUS.

SPECIFICATION forming part of Letters Patent No. 263,172, dated August 22, 1882.

Application filed January 18, 1882. (No model.)

*To all whom it may concern:*

Be it known that I, JOHN F. GUBBINS, of Chicago, in the county of Cook and State of Illinois, have invented certain Improvements in Drying and Pulverizing Apparatus, of which the following is a specification.

My invention relates to apparatus for drying and pulverizing animal and vegetable matters; and it consists in certain details of construction hereinafter set forth.

Hitherto machines or apparatus of this kind have commonly been constructed with a hollow shaft to receive steam, and have been provided with an open outlet-pipe to carry off the water of condensation from the steam-space. Under such construction it has been found difficult to prevent the entrance of steam and moisture into the inner chamber, the latter by condensation, and a large loss of steam has occurred. The admission of steam or moisture to the interior of the cylinder materially retards and impairs the drying and pulverizing operations and lessens the efficiency of the apparatus. To overcome these diffiulties I construct my improved machine as illustrated in the drawings, in which—

Figure 1 represents a longitudinal vertical section, and Fig. 2 a transverse vertical section, of the machine; and Figs. 3 and 4, views showing the arrangement of the beaters or blades.

A represents a strong frame-work, upon or in which is mounted a stationary horizontal cylinder, B, provided with an enveloping jacket or outer cylinder, C, both tightly closed at their ends, as shown. The cylinder B is furnished with charging hoppers or openings D and discharge spouts or openings E, provided with closing doors or devices, as shown. The openings to and from the inner cylinder, B, are walled to prevent communication with the steam-space $a$, and a pipe, F, opens from the side of the charging-hopper or directly from cylinder B to carry off the vapors arising within the cylinder, a suction-fan, G, being connected with the pipe to exhaust the vapors and to carry off the foul odors. The steam-space $a$ is provided with one or more steam-inlets, J, and with a steam-trap, K, by which the water of condensation may pass off without permitting the escape of the steam. This trap may be of any usual or well-known construction, the float-valve shown being well adapted for the purpose.

Passing longitudinally through the cylinder B is a central rotary shaft, H, carried in boxes or bearings $b$ at opposite ends of the cylinder, and provided at one end with a driving wheel or gear, I, through which motion is imparted to the shaft. The shaft is furnished within the cylinder B with two series of beaters and scrapers, L and L', which are constructed and arranged as shown in Fig. 3, where they will be seen to consist of a series of blades, $c$, secured upon radial arms $d$, which serve also as beaters, the arms being in turn bolted to collars $e$, which may be adjusted upon or around the shaft, as desired. The blades $c$ are inclined relatively to the shaft B and stand in planes intersecting said shaft at an angle, the blades of the series L being inclined in a direction the reverse of the blades of series L'. The blades of series L are arranged to alternate with those of the series L', as shown in Fig. 3, and, as a consequence of the reverse inclination and alternate arrangement, the blades are caused to move the material back and forth in far more efficient manner than could otherwise be done.

A circulation of steam through the space $a$ may be produced in any usual way, and an inlet to cylinder B may be provided and furnished with a valve or damper to permit and control the entrance of air to furnish the necessary draft for the fan G.

The operation is as follows: The cylinder B is charged with material to be treated, the outlets or openings are closed, steam is admitted to space $a$, and the fan is put in motion, drawing off all vapors and odors arising from the material under treatment. The drying action is facilitated by the mixing and turning of the material, exposing all its particles and permitting the vapors to escape freely. As the matter becomes dry it grows friable, and is rapidly pulverized and disintegrated by the blades $c$ and beaters or arms $d$.

I am aware that tobacco has been dried in a chamber heated by a surrounding body of steam and from which air or vapor was drawn by a fan; and I am likewise aware that clay has been heated and rendered plastic in a steam-jacketed cylinder into which steam was admitted to aid in effecting the plastic condition of the clay.

My plan differs from the first of these in that the operations of drying and pulverizing are carried on simultaneously, and in that the material is subjected to a beating and mixing action, instead of being merely caused to roll over or fall from ledges on the walls of the rotary cylinder. It differs from the second of these in that, instead of admitting steam to the material under treatment, I carefully exclude it therefrom, and in that I draw off the vapors and moisture, which in the plan referred to remain.

I am also aware that it is not broadly new to incline mixing or stirring blades to the right and left for the purpose of working material back and forth, this having been done in coffee-roasters.

Having thus described my invention, what I claim is—

1. The herein-described drying and pulverizing apparatus, consisting of the cylinder B, provided with a central shaft carrying beaters and scrapers and communicating with an exhaust-fan, and the outer cylinder, C, communicating with a steam-supply and provided with a steam-trap, substantially as set forth and shown.

2. In an apparatus for drying and pulverizing offal, the combination of a steam-jacketed chamber, a shaft extending longitudinally through the chamber, and two series, L L', of scrapers and beaters, the blades of one series alternating with those of the other and inclined in a reverse direction thereto, as shown and described.

JOHN F. GUBBINS.

Witnesses:
W. C. MINARD,
HARRY F. McBRIDE.